United States Patent
Gota et al.

(10) Patent No.: US 6,841,655 B1
(45) Date of Patent: Jan. 11, 2005

(54) SURFACTANTS

(75) Inventors: Tetsuya Gota, Tokyo (JP); Kazushi Kobayashi, Tokyo (JP); Kaoru Komiya, Tokyo (JP); Masahide Tsuzuki, Tokyo (JP); Takeaki Mizutari, Tokyo (JP)

(73) Assignee: Asahi Denka Co., Ltd., Tokyo (JP)

( * ) Notice: Subject to any disclaimer, the term of this patent is extended or adjusted under 35 U.S.C. 154(b) by 0 days.

(21) Appl. No.: 10/451,149

(22) PCT Filed: Dec. 25, 2001

(86) PCT No.: PCT/JP01/11388
§ 371 (c)(1),
(2), (4) Date: Jun. 27, 2003

(87) PCT Pub. No.: WO02/057320
PCT Pub. Date: Jul. 25, 2002

(30) Foreign Application Priority Data

Dec. 28, 2000 (JP) ........................ 2000-402461

(51) Int. Cl.$^7$ ................................ C08G 65/34
(52) U.S. Cl. .................. 528/425; 528/271; 528/422
(58) Field of Search ................ 528/425, 271, 528/422

(56) References Cited

FOREIGN PATENT DOCUMENTS

| JP | 63-54927 | 3/1988 |
|---|---|---|
| JP | 63-214334 | 9/1988 |
| JP | 02-256048 | 10/1990 |
| JP | 7-185296 | 7/1995 |
| JP | 8-12619 | 1/1996 |
| JP | 8-34897 | 2/1996 |
| JP | 8-41112 | 2/1996 |
| JP | 9-208609 | 8/1997 |
| JP | 2001-261719 | 9/2001 |

*Primary Examiner*—Duc Truong
(74) *Attorney, Agent, or Firm*—Oblon, Spivak, McClelland, Maier & Neustadt, P.C.

(57) ABSTRACT

Disclosed are surfactants represented by the following formula (1):

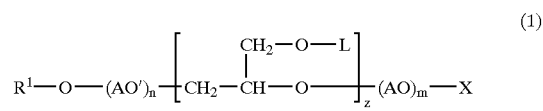

wherein $R^1$ represents a branched aliphatic hydrocarbon group, a secondary aliphatic hydrocarbon group or a branched aliphatic acyl group, AO and AO' each independently represents an oxyalkylene group having 2 to 4 carbon atoms, L represents a group represented by formula (2) to be described below, z stands for a number of from 1 to 10, X represents a hydrogen atom or an ionic hydrophilic group, m stands for a number of from 0 to 1,000, and n stands for a number of from 0 to 1,000.

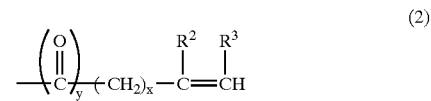

wherein $R^2$ and $R^3$ each independently represents a hydrogen atom or a methyl group, x stands for a number of from 0 to 12, and y stands for a number of 0 or 1. These surfactants do not contain any phenyl ether group considered to have significant effects on the environment, such as a nonylphenyl group, and have performance comparable with reactive surfactants containing one or more phenyl ether groups. Emulsifiers for emulsion polymerization, dispersants for dispersion polymerization and resin modifiers, all of which contain the surfactants, are also disclosed.

13 Claims, No Drawings

SURFACTANTS

TECHNICAL FIELD

This invention relates to reactive surfactants containing a branched aliphatic hydrocarbon group, a secondary aliphatic hydrocarbon group or a branched aliphatic acyl group, and also to their specific applications.

BACKGROUND ART

Surfactants have a wide variety of functions such as emulsification, dispersion, cleaning, wetting and foaming. Using these various functions, they have been employed for many years in numerous fields led by fibers and including paper, rubber, plastics, metals, paints, pigments, civil engineering and construction. Especially in recent years, there is an increasingly active move toward providing merchandise, which make use of surfactants, with higher performance. Keeping in step with this move, attentions have also been drawn to drawbacks which surfactants are associated with.

For example, surfactants are contained in products such as paints, printing inks and adhesives, because they are considered to be indispensable upon production or from the standpoint of stabilization of the products and working convenience. Upon actually using such surfactants-containing products in work such as coating, printing, adhesion or bonding, however, the surfactants are fundamentally unnecessary and in many instances, rather deteriorate properties such as waterproofness and oil resistance of coatings, printed surfaces, adhesive films and the like.

Emulsifiers for emulsion polymerization, which are used upon producing polymers by emulsion polymerization, are known not only to take part in polymerization-initiating reactions and polymer-forming reactions but also to affect the mechanical stability, chemical stability, freezing stability, storage stability and the like of the resulting emulsions. Further, they are also known to give significant effects on physical properties of the emulsions, such as particle size, viscosity and foaming potential and, when formed into films, physical properties of the films, such as waterproofness, weatherability, adhesion and heat resistance. As problems in such emulsion polymerization, it has been pointed out that the emulsion-polymerized emulsions are highly foamed due to the emulsifiers contained therein and that physical properties of films, such as adhesion, waterproofness, weatherability and heat resistance, are lowered. In polymers produced by suspension polymerization, similar problems caused by the dispersants for the suspension polymerization have also been pointed out.

These problems can be attributed to the surfactants still remaining in free forms in the polymers. As a method for lowering the contents of such free surfactants, surfactants which react with polymers during polymerization or molding or other forming and do not remain in free forms in the polymers, that is, so-called reactive surfactants which may also be called "polymerizable surfactants" have been developed.

Concerning reactive surfactants, many structures have been proposed. Paying attention to their hydrophobic groups, examples can include sulfosuccinate esters containing hydrocarbon groups disclosed in JP 49-46291 B; alkoxylates of allyl- or propenyl-containing, hydrocarbyl-substituted phenols, disclosed in JP 62-100502 A, JP 63-23725 A, JP 4-50202 A and JP 4-50204 A; alkoxylates of hydrocarbyl- or acyl-containing glycerin derivatives, disclosed in JP 62-104802 A; formaldehyde-crosslinked, (substituted) phenol derivatives disclosed in JP 62-11534 A; and as hydrophobic groups, alkyl groups derived from an α-olefin oxide, disclosed in JP 63-319035 A and JP 4-50204 A. Incidentally, the term "hydrocarbon or hydrocarbyl group" as used in the above-described conventional art includes alkyl groups, alkenyl groups, aryl groups, and the like.

Among these reactive surfactants, those containing one or more phenyl ether groups as hydrophobic groups have found wide-spread utility for their excellent properties such as emulsifying property, dispersing property, and polymerization-stabilizing property.

In recent years, however, a concern has arisen about a potential problem that nonyl phenol may show false hormone effects on organisms to disrupt the endocrine system, that is, the so-called endocrine problem has arisen, so that research have also been conducted in efforts to provide replacements for reactive surfactants containing one or more phenyl ether groups. However, reactive surfactants containing one or more hydrophobic groups other than phenyl ether groups, for example, general alkyl groups, alkenyl groups or the like are accompanied by a drawback in that they are inferior in performance to the reactive surfactants containing one or more phenyl ether groups.

An object of the present invention is, therefore, to solve the above-described conventional problems, and to provide a surfactant which does not contain any phenyl ether group considered to give considerable effects on the environment, such as nonylphenyl group, and has performance comparable with the reactive surfactants containing one or more phenyl ether groups.

DISCLOSURE OF THE INVENTION

The present inventors, therefore, have proceeded with an extensive investigation and as a result, have found that a reactive surfactant containing a branched aliphatic hydrocarbon group or a branched aliphatic acyl group as a hydrophobic group has performance comparable with reactive surfactants containing one or more (substituted) phenyl ether groups and moreover, gives substantially no deleterious effect on the environment, leading to the completion of the present invention. Described specifically, the present invention provides a surfactant represented by the following formula (1):

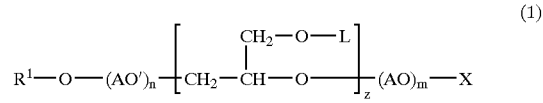

(1)

wherein $R^1$ represents a branched aliphatic hydrocarbon group, a secondary aliphatic hydrocarbon group or a branched aliphatic acyl group, AO and AO' each independently represents an oxyalkylene group having 2 to 4 carbon atoms, L represents a group represented by formula (2) to be described below, z stands for a number of from 1 to 10, X represents a hydrogen atom or an ionic hydrophilic group, m stands for a number of from 0 to 1,000, and n stands for a number of from 0 to 1,000.

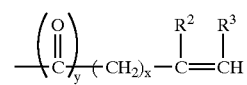

(2)

wherein $R^2$ and $R^3$ each independently represents a hydrogen atom or a methyl group, x stands for a number of from 0 to 12, and y stands for a number of 0 to 1.

The present invention also provides an emulsifier for emulsion polymerization, a dispersant for suspension polymerization and a resin modifier, all of which comprises the surfactant represented by formula (1).

BEST MODES FOR CARRYING OUT THE INVENTION

The present invention will next be described in detail based on certain embodiments.

In the formula (1), $R^1$ represents a branched aliphatic hydrocarbon group, a secondary aliphatic hydrocarbon group or a branched aliphatic acyl group. The branched aliphatic hydrocarbon group or secondary aliphatic hydrocarbon group is a residual group of its corresponding branched aliphatic alcohol or secondary aliphatic alcohol.

Examples of such a branched aliphatic alcohol can include isobutyl alcohol, tertiary butyl alcohol, isopentyl alcohol, neopentyl alcohol, tertiary pentyl alcohol, isohexanol, 2-methylpentanol, isoheptanol, isooctanol, 2-ethylhexanol, isononanol, 3,4,4-trimethylhexanol, isodecanol, 2-propylheptanol, isoundecanol, isododecanol, 2-butyloctanol, isotridecanol, isotetradecanol, isomyristyl alcohol, 2-pentylnonanol, isopentadecanol, isohexadecanol, isopalmityl alcohol, 2-henxyldecanol, isoheptadecanol, isooctadecanol, isostearyl alcohol, 2-heptylundecanol, isononanadecanol, isoeicosanol, 2-octyldodecanol, 2-nonyltridecanol, 2-decyltetradecanol, 2-undecylpentadecanol, 2-dodecylhexadecanol, 2-tridecylheptadecanol, 2-tetradecyloctadecanol, 2-pentadecylnonadecanol, 2-hexadecyleicosanol, 1,1-dimethyl-2-propenol, 3-methyl-3-butenol, 3-methyl-2-butenol, isohexenol, isoheptenol, isooctenol, isononenol, isodecenol, isoundecenol, isododecenol, isotridecenol, isotetradecenol, isopentadecenol, isohexadecenol, isoheptadecenol, isooctadecenol, isooleyl alcohol, isononanadecenol, and isoeicocenol.

Examples of such a secondary aliphatic alcohol can include isopropanol, 2-butanol, 2-octanol, secondary decanol, secondary undecanol, secondary dodecanol, secondary tridecanol, isotridecanol, secondary tetradecanol, secondary pentadecanol, secondary hexadecanol, secondary heptadecanol, and secondary octadecanol.

On the other hand, the branched aliphatic acyl group is a residual group of its corresponding branched fatty acid. Examples of the branched aliphatic acyl group can include isobutanoic acid, isopentanoic acid, neopentanoic acid, isohexanoic acid, 2-methylpentanoic acid, neohexanoic acid, isoheptanoic acid, neoheptanoic acid, isooctanoic acid, 2-ethylhexanoic acid, neooctanoic acid, isonoanoic acid, 3,4,4-trimethylhexanoic acid, neononanoic acid, isodecanoic acid, 2-propylheptanoic acid, neodecanoic acid, isoundecanoic acid, isododecanoic acid, 2-butyloctanoic acid, isotridecanoic acid, isotetradecanoic acid, isomyristic acid, 2-pentylnonanoic acid, isopentadecanoic acid, isohexadecanoic acid, isopalmitic acid, 2-hexyldecanoic acid, isoheptadecanoic acid, isooctadecanoic acid, isostearic acid, 2-heptylundecanoic acid, isononanadecanoic acid, isoeicosanoic acid, 2-octyldodecanoic acid, 2-nonyltridecanoic acid, 2-decyltetradecanoic acid, 2-undecylpentadecanoic acid, 2-dodecylhexadecanoic acid, 2-tridecylheptadecanoic acid, 2-tetradecyloctadecanoic acid, 2-pentadecylnonadecanoic acid, 2-hexadecyleicosanoic acid, and isooleic acid.

Among these branched aliphatic hydrocarbon groups, secondary aliphatic hydrocarbon groups and aliphatic acyl groups, those having 8 to 36 carbon atoms are preferred, with those having 10 to 28 carbon atoms being more preferred. Further, those having many branches are preferred because the emulsifying property, dispersing property, polymerization-stabilizing property and the like of a surfactant are improved with the number of branches. In particular, those having 3 or more methyl groups per molecule are preferred. Hydrocarbon groups or acyl groups having such many branches may include hydrocarbon or acyl groups each of which is in the form of a mixture of many structural isomers like commercial isotridecanol. In the case of each of such hydrocarbon or acyl groups, the number of methyl groups in a molecule can be determined by a spectrochemical analysis method such as $^1$H-NMR.

In the formula (1), the $(AO)_m$ and $(AO')_n$ moieties can each be obtained by addition polymerization or the like of an alkylene oxide having 2 to 4 carbon atoms, such as ethylene oxide, propylene oxide, butylene oxide or tetrahydrofuran (1,4-butylene oxide). When $(AO)_m$ and $(AO')_n$ are each formed by addition polymerization of an alkylene oxide, $(AO)_m$ and $(AO')_n$ are each determined by the alkylene oxide so added. No limitation is imposed on the manner of polymerization of the alkylene oxide, so that the polymerization can be homopolymerization of an alkylene oxide, or random copolymerization, block copolymerization, random/block copolymerization or the like of two or more alkylene oxides. The polymerization degree m is a number in the range of from 0 to 1,000 and, when X is a hydrogen atom, may range preferably from 1 to 200, more preferably from 3 to 100, still more preferably from 10 to 50. When X is an ionic hydrophilic group, the polymerization degree may range preferably from 1 to 200, more preferably from 2 to 100, still more preferably from 2 to 50.

As AO, an oxyethylene group is most preferred. When AO is formed of two or more types of groups, one type of group(s) may preferably be oxyethylene group(s), and the $(AO)_m$ moiety may be a polyoxyalkylene chain containing preferably 50 to 100 mole %, more preferably 60 to 100 mole % of oxyethylene groups.

AO', on the other hand, may preferably be an oxyethylene group from the standpoint of the availability of its raw material when $R^1$ is a secondary aliphatic hydrocarbon group. When $R^1$ is a branched aliphatic hydrocarbon group, secondary aliphatic hydrocarbon group or branched aliphatic acyl group having about 3 to 10 carbon atoms, AO' may preferably be an oxyalkylene group having 3 or 4 carbon atoms. The polymerization degree n is a number in the range of from 0 to 1,000, and may range preferably from 0 to 100, more preferably from 0 to 50, still more preferably from 0 to 30. Especially when $R^1$ is a branched aliphatic hydrocarbon group, secondary aliphatic hydrocarbon group or branched aliphatic acyl group having about 3 to 10 carbon atoms, the polymerization degree n may range preferably from 2 to 30. The hydrophilic property or hydrophobic property of the surfactant represented by the formula (1) can be adjusted by the numbers m and n. It is preferred to adjust m and n to appropriate polymerization degrees depending on the application purpose.

In the formula (1), L represents a group of the following formula (2). The group represented by formula (2) is a reactive group in the surfactant of the present invention.

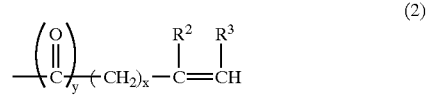

(2)

wherein $R^2$ and $R^3$ each independently represents a hydrogen atom or a methyl group, x stands for a number of from 0 to 12, and y stands for a number of 0 or 1.

Illustrative of the group represented by the formula (2) are alkenyl groups such as vinyl, 1-propenyl, allyl, methallyl, 2-butenyl, 3-butenyl, 4-pentenyl, 3-methyl-3-butenyl, 5-hexenyl, 8-nonenyl and 10-dodecenyl; and unsaturated acyl groups such as acryl, methacryl, 2-butenoyl, 3-methyl-3-butenoyl and 2-dodecenoyl. Of these, allyl, methallyl, acryl and methacyl are preferred for the availability and reactivity of their raw materials. Further, groups represented by the formula (2) can be copolymerized (radical polymerization or ionic polymerization) with other radically-polymerizable, reactive groups. In addition, they can also be reacted with a compound containing a group other than a polymerizable reactive group such as an organopolysiloxane containing an Si—H group.

In the formula (1), z stands for a number of from 1 to 10. Depending on the production process or the like, the surfactant may be obtained in the form of a mixture of compounds having different z numbers. In the case of such a mixture, z indicates an average number. As the number z becomes closer to 1, the surfactant of the present invention tends to be more improved in emulsifying property, dispersing property, polymerization-stabilizing property and the like. When importance is placed on emulsifying property, dispersing property, polymerization-stabilizing property and the like, the preferred number of z can range from 1 to 8, with the number of from 1 to 5 being more preferred, and the number of from 1 to 3 being most preferred.

When z is a number greater than 1, there is a tendency that emulsion polymerization or suspension polymerization making use of the surfactant according to the present invention can provide the resulting resin with improved waterproofness and mechanical strength. A z number greater than 10, however, leads to lower polymerization-stabilizing property in emulsion polymerization or suspension polymerization and, for example, to more readily occurrence of agglomerates during the polymerization reaction. Therefore, z is preferably a number greater than 1 when importance is placed on the waterproofness and mechanical property of a resin. When the surfactant of the present invention is a mixture of compounds the z numbers of which are 1 and 2 or greater, respectively, z can range preferably from 1.1 to 8 on average.

In the formula (1), X represents a hydrogen atom or an ionic hydrophilic group. Illustrative of the ionic hydrophilic group are anionic hydrophilic groups and cationic hydrophilic groups. Examples of the anionic hydrophilic groups out of these ionic hydrophilic groups can include —$SO_3M$, —$R^4$—$SO_3M$, —$R^5$—COOM, —$PO_3M_2$, —$PO_3$ MH and —CO—$R^6$—COOM.

In the above-described formulas which represent the anionic hydrophilic groups, respectively, M represents a hydrogen atom; an alkali metal atom such as lithium, sodium or potassium; an alkaline earth metal atom such as magnesium or calcium, with a proviso that the number of M is ½ since an alkaline earth metal is generally divalent; or an ammonium ion. Illustrative of the ammonium ion are an ammonium ion available from ammonia; ammonium ions available from alkylamines such as monomethylamine and dipropylamine; and ammonium ions available from alkanolamines such as monoethanolamine, diethanolamine and triethanolamine.

$R^1$ and $R^5$ each independently represents an alkylene group such as methylene, ethylene, propylene, butylene, pentene, pentamethylene or hexamethylene. Among these, alkylene groups having 1 to 4 carbon atoms, such as methylene, ethylene, propylene and butylene, are preferred from the availability of raw materials.

$R^6$ represents a residual group obtained by eliminating the carboxyl groups from a dibasic acid or an anhydride thereof. Examples of the dibasic acid can include oxalic acid, malonic acid, succinic acid, glutaric acid, adipic acid, pimelic acid, suberic acid, azelaic acid, sebacic acid, undecanoic diacid, dodecanoic diacid, tridecanoic diacid and tetradecanoic diacid; saturated alicyclic dicarboxylic acids such as cyclopentanedicarboxylic acid, hexahydrophthalic acid and methylhexahydrophthalic acid; aromatic dicarboxylic acids such as phthalic acid, isophthalic acid, terephthalic acid, tolyenedicarboxylic acid and xylylenedicarboxylic acid; unsaturated aliphatic dicarboxylic acids such as maleic acid, fumaric acid, itaconic acid, citraconic acid and mesaconic acid; and unsaturated alicyclic dicarboxylic acids such as tetrahydrophthalic acid, methyltetrahydrophthalic acid, nadic acid (endomethylenetetrahydrophthalic acid), methylnadic acid, methylbutenyltetrahydrophthalic acid and methylpentenyltetrahydrophthalic acid. At the production stage, they may be used in the form of anhydrides.

Among these anionic hydrophilic groups, groups represented by —$SO_3M_1$—$PO_3M_3$ and —$PO_3$ MH are preferred.

X can also be a cationic hydrophilic group. Illustrative of the cationic hydrophilic group are those represented by —$R^7$—$NR^8R^9R^{10}$.Y or -$Z$-$NR^8R^9R^{10}$.Y. In these formulas representing cationic hydrophilic groups, Y represents a halogen atom or a methylsulfuric group (—$CH_3SO_4$). Examples of the halogen atom can include a chlorine atom, bromine atom and iodine atom. On the other hand, $R^7$ represents an alkylene group having 1 to 4 carbon atoms. Illustrative of the alkylene group having 1 to 4 carbon atoms are alkylene groups similar to those exemplified above in connection with the anionic hydrophilic group $R^4$.

$R^8$, $R^9$ and $R^{10}$ each independently represents an alkyl group having 1 to 4 carbon atoms, an alkanol group having 2 to 4 carbon atoms, or a benzyl group. Examples of the alkyl group having 1 to 4 carbon atoms can include methyl, ethyl, propyl, isopropyl, butyl, isobutyl, secondary butyl, and tertiary butyl. Examples of the alkanol group having 2 to 4 carbon atoms, on the other hand, can include 2-hydroxyethyl, 2-hydroxypropyl and 2-hydroxybutyl. Further, Z is a group represented by —$CH_2CH(OH)CH_2$— or —$CH(CH_2OH)CH_2$—.

No particular limitation is imposed on the process for the production of the surfactant represented by the formula (1). Where X is a hydrogen atom, for example, (a) the surfactant can be obtained by adding, in a manner known per se in the art, m moles of an alkylene oxide to a reaction product between a glycidyl ether or glycidyl ester containing a reactive group represented by the formula (2) and a branched aliphatic alcohol, a secondary aliphatic alcohol, a branched fatty acid or the like. As an alternative, (b) it can also be obtained by reacting, in a manner known per se in the art, m moles of an alkylene oxide to a reaction product between the glycidyl ether of a branched aliphatic alcohol or secondary aliphatic alcohol or the glycidyl ester of a branched fatty acid and an alcohol or carboxylic acid containing a reactive group represented by the formula (2). To confirm the completion of the reaction between the glycidyl ether or glycidyl ester and the alcohol or carboxylic acid, an IR absorption or epoxy equivalent, for example, can be measured to ascertain the end point. In the above-described production process (a), the branched aliphatic alcohol, secondary aliphatic alcohol or branched fatty acid may still remain unreacted in the reaction product between the glycidyl ether or glycidyl ester containing the reactive group represented by the formula (2) and the branched aliphatic alcohol, the secondary aliphatic alcohol, the branched fatty acid or the like. If this is found to be the case, the alkylene oxide may be added subsequent to removal of such an unreacted alcohol or acid as needed.

In the above-described production, a catalyst can also be used as needed. No particular limitation is imposed on the catalyst insofar as it is one commonly employed in ring-opening reactions of epoxy compounds. Illustrative are tertiary amines, quaternary ammonium salts, boron trichloride or its ether complexes, aluminum chloride, barium oxide, sodium hydroxide, and potassium hydroxide.

No particular limitations are imposed on reaction conditions upon adding the alkylene oxide. In general, the reaction temperature and pressure can be set at room temperature to 150° C. and 0.01 to 1 MPa, respectively, and if necessary, sodium hydroxide, potassium hydroxide, boron trifluoride or the like can be used as a catalyst. Where X is an ionic hydrophilic group, the compound obtained through the above-described reaction is subjected further to a reaction such that the ionic hydrophilic group can be introduced.

When conversion into a sulfate ester is conducted to introduce an anionic hydrophilic group represented by —$SO_3M$ out of the formulas representing ionic hydrophilic groups, it is possible to use, for example, sulfamic acid, sulfuric acid, sulfuric anhydride, fuming sulfuric acid, chlorosulfonic acid or the like as an anionic hydrophilizing agent. No particular limitation is imposed on reaction conditions upon conducting the conversion into a sulfate ester, but in general, the reaction can be conducted at a temperature of from room temperature to 150° C. under environmental pressure or an elevated pressure up to about 0.5 MPa for approximately 1 to 10 hours.

When an anionic hydrophilic group represented by —$R^4$—$SO_3M$ is introduced out of the formulas representing ionic hydrophilic groups, it is possible to use, for example, propanesultone, butanesultone or the like as an anionic hydrophilizing agent. No particular limitation is imposed on reaction conditions upon sulfonation, but in general, the reaction can be conducted at a temperature of from room temperature to 100° C. under environmental pressure or an elevated pressure up to about 0.5 MPa for approximately 1 to 10 hours. An alkali such as sodium hydroxide or potassium hydroxide may be used as a catalyst as needed. Further, a solvent may be added as needed.

When carboxylation is conducted to introduce an anionic hydrophilic group represented by —$R^5$—COOM out of the formulas representing ionic hydrophilic groups, it is possible to use, for example, chloroacetic acid ($R^5$: methyl), chloropropionic acid ($R^5$: ethyl), a salt thereof or the as an anionic hydrophilizing agent. No particular limitation is imposed on reaction conditions upon conducting the carboxylation, but in general, the carboxylation can be conducted at a temperature of from room temperature to 150° C. under environmental pressure or an elevated pressure up to about 0.5 MPa for approximately 1 to 10 hours. An alkali such as sodium hydroxide or potassium hydroxide may be used as a catalyst as needed.

When conversion into a phosphate ester is conducted to introduce an anionic hydrophilic group represented by —$PO_3M_2$ or —$PO_3$ MH out of the formulas representing ionic hydrophilic groups, it is possible to use, for example, diphosphorus pentoxide, polyphosphoric acid, orthophosphoric acid, phoshorus oxychloride or the like as an anionic hydrophilizing agent. The conversion into a phosphate ester a monoester compound and a diester compound are obtained as a mixture. They may be separated from each other. If their separation is difficult, however, they may be used as are, that is, in the form of the mixture. No particular limitation is imposed on reaction conditions upon conducting the conversion into a phosphate ester, but in general, the reaction can be conducted at a temperature of from room temperature to 150° C. under environmental pressure for approximately 1 to 10 hours.

When conversion into a dibasic acid is conducted to introduce an anionic hydrophilic group represented by —CO—$R^6$—COOM out of the formulas representing ionic hydrophilic groups, it is possible to use, for example, the above-mentioned dibasic acid or an anhydride thereof as an anionic hydrophilizing agent. Illustrative are maleic acid ($R^6$: CH=CH), phthalic acid ($R^6$: phenyl), and salts or anhydrides thereof. No particular limitation is imposed on reaction conditions upon conducting the conversion into a dibasic acid, but in general, the reaction can be conducted at a temperature of from room temperature to 150° C. under environmental pressure for approximately 1 to 10 hours. An alkali such as sodium hydroxide or potassium hydroxide may be used as a catalyst as needed.

When anionic hydrophilization is conducted, post-neutralization may be conducted with an alkali such as sodium hydroxide or potassium hydroxide, ammonia, an alkylamine, or an alkanolamine such as monoethanolamine or diethanolamine.

When introducing a cationic hydrophilic group represented by —$R^1$—$NR^8R^9R^{10}$ Y out of the formulas representing ionic hydrophilic groups, the cationic hydrophilic group can be introduced by firstly halogenating the hydroxyl group of a compound represented by the formula (1), in which X is a hydrogen atom, with a halogenating agent such as thionyl chloride, thionyl bromide or phosgene and then reacting a tertiary amine compound. As an alternative, a secondary amine compound can be reacted in place of a tertiary amine compound, followed by a reaction with an alkyl halide, dimethyl sulfate or the like. No particular limitation is imposed on reaction conditions upon halogenating the hydroxyl group, but in general, the halogenation can be conducted at a temperature of from room temperature to 100° C. under environmental pressure or an elevated pressure up to about 0.5 MPa for approximately 1 to 10 hours. No particular limitation is imposed either upon amination, but in general, the amination can be conducted at a temperature of from room temperature to 150° C. under environmental pressure or an elevated pressure up to about 0.5 MPa for approximately 1 to 10 hours. An alkali such as sodium hydroxide or potassium hydroxide may be used as a catalyst as needed.

When introducing a cationic hydrophilic group represented by -Z-$NR^8R^9R^{10}$—Y out of the formulas representing ionic hydrophilic groups, the cationic hydrophilic group can be introduced by firstly reacting an epihalohydrin such as epichlorohydrin or epibromohydrin with a compound represented by the formula (1), in which X is a hydrogen atom, and then further reacting a tertiary amine compound. As an alternative, a secondary amine compound can be reacted in place of a tertiary amine compound, followed by a reaction with an alkyl halide, dimethyl sulfate or the like. No particular limitation is imposed on reaction conditions upon reacting the epihalohydrin, but in general, the reaction can be conducted at a temperature of from room temperature to 100° C. under environmental pressure or an elevated pressure up to about 0.3 MPa for approximately 1 to 10 hours. An alkali catalyst such as sodium hydroxide or potassium hydroxide or an acid catalyst such as sulfuric acid, phosphoric acid, iron chloride, boron fluoride or tin chloride may be used as needed. No particular limitation is imposed either upon amination, but in general, the amination can be conducted at a temperature of from room temperature to 150° C. under environmental pressure or an elevated pressure up to about-0.5 MPa for approximately 1 to 10 hours. An alkali such as sodium hydroxide or potassium hydroxide may be used as a catalyst as needed.

Surfactants according to the present invention can be used for applications in which reactive surfactants containing one or more phenyl ether groups have been used to date, specifically as emulsifiers for emulsion polymerization, dispersants for suspension polymerization, resin modifiers (for improvements in water repellency, adjustments in hydrophilicity, improvements in antistatic properties, improvements in anti-fogging properties, improvements in waterproofness, improvements in adhesion properties, improvements in dyeability, improvements in film-forming properties, improvements in weatherability, improvements in anti-blocking properties, etc.), fiber processing aids, non-dripping agents, soil resistance finishes, and the like. They can also be used as raw materials for copolymerizable surfactants (for example, those disclosed in JP 10-120712 A, etc.) and raw materials for surfactant-modified organopolysiloxanes (for example, those disclosed in JP 6-65379 A, etc.

When any one of the surfactants according to the present invention is used as an emulsifier for emulsion polymerization, it can be used in any desired proportion within a proportion range in which conventionally-known emulsifiers for emulsion polymerization are used ordinarily. In general, however, it can be used preferably in a proportion of from 0.1 to 20 wt. %, more preferably in a proportion of from 0.2 to 10 wt. % based on the raw material monomer or monomers. Further, the invention emulsifier for emulsion polymerization can be used in combination with another reactive or non-reactive emulsifier. Although no particular limitation is imposed on the monomer(s) to be subjected to emulsion polymerization, the invention emulsifier for emulsion polymerization can be used preferably for acrylate emulsions, styrene emulsions, vinyl acetate emulsions, SBR (styrene/butadiene) emulsion, ABS (acrylonitrile/butadiene/styrene) emulsion, BR (butadiene) emulsion, IR (isoprene) emulsion, NBR (acrylonitrile/butadiene) emulsion, and the like.

Examples of (co)polymerizable monomers in the acrylate emulsions can include (meth)acrylic acid (acrylate) alone, (meth)acrylic acid (acrylate)/styrene, (meth)acrylic acid (acrylate)/vinyl acetate, (meth)acrylic acid (acrylate)/acrylonitrile, (meth)acrylic acid (acrylate)/butadiene, (meth)acrylic acid (acrylate)/vinylidene chloride, (meth)acrylic acid (acrylate)/allylamine, (meth)acrylic acid (acrylate)/vinylpyridine, (meth)acrylic acid (acrylate)/alkylolamides, (meth)acrylic acid (acrylate)/N,N-dimethylaminoethyl esters, and (meth)acrylic acid (acrylate)/N,N-diethylaminoethyl vinyl ether.

Examples of (co)polymerizable monomers in the styrene emulsions can include, in addition to styrene alone, styrene/acrylonitrile, styrene/butadiene, styrene/fumaronitrile, styrene/maleonitrile, styrene/cyanoacrylate esters, styrene/phenylvinyl acetate, styrene/chloromethylstyrene, styrene/dichlorostyrene, styrene/vinylcarbazole, styrene/N,N-diphenylacrylamide, styrene/methylstyrene, acrylonitrile/butadiene/styrene, styrene/acrylonitrile/methylstyrene, styrene/acrylonitrile/vinylcarbazole, and styrene/maleic acid.

Examples of (co)polymerizable monomers in the vinyl acetate emulsions can include, in addition to vinyl acetate alone, vinyl acetate/styrene, vinyl acetate/vinyl chloride, vinyl acetate/acrylonitrile, vinyl acetate/maleic acid (maleates), vinyl acetate/fumaric acid (fumarates), vinyl acetate/ethylene, vinyl acetate/propylene, vinyl acetate/isobutylene, vinyl acetate/vinylidene chloride, vinyl acetate/cyclopentadiene, vinyl acetate/crotonic acid, vinyl acetate/acrolein, and vinyl acetate/alkyl vinyl ethers.

When any one of the surfactants according to the present invention is used as a dispersant for suspension polymerization, it can be used in any desired proportion within a proportion range in which conventionally-known dispersants for suspension polymerization are used ordinarily. In general, however, it can be used preferably in a proportion of from 0.1 to 20 wt. %, more preferably in a proportion of from 0.2 to 10 wt. % based on the raw material monomer or monomers. Further, the invention dispersant for suspension polymerization can be used in combination with another reactive or non-reactive dispersant, for example, polyvinyl alcohol or the like. No particular limitation is imposed on the monomer(s) to be subjected to suspension polymerization, and the invention dispersant for suspension polymerization can be used for the homopolymerization or copolymerization of the above-described monomers each having one or more polymerizable carbon—carbon double bonds. Preferably, the invention dispersant for suspension polymerization can be used for the homopolymerization or copolymerization of halogenated olefinic monomers, vinyl acetate monomers and the like.

Examples of the halogenated olefinic monomers can include vinyl chloride, vinylidene chloride, vinyl chloride/maleic acid (maleates), vinyl chloride/fumaric acid (fumarates), vinyl chloride/vinyl acetate, vinyl chloride/vinylidene chloride, vinylidene chloride/vinyl acetate, and vinylidene chloride/vinyl benzoate.

When the surfactants according to the present invention are used as resin modifiers, physical properties to be modified are, for example, hydrophilicity, compatibility, antistatic properties, anti-fogging properties, adhesion properties, dyeability, film-forming properties, weatherability, and anti-blocking properties. No particular limitation is imposed on the resin to be modified, and the surfactants according to the present invention can be used for all polymers available from (co)polymerization of the above-described monomers. In addition, the surfactants according to the present invention can also be used, for example, for polyester resins, polyamide resins, polyimide resins, polyaryl ether resins, epoxy resins, and urethane resins. Resins which can be used particularly preferably are polyhalogenated olefins such as vinyl chloride and vinylidene chloride; and poly (α-olefins) such as ethylene and propylene.

The resin modifiers according to the present invention can be added to resins, for example, by coating them onto surfaces of the resins or incorporating them in the resins with kneading. When any one of the resin modifiers according to the present invention is polymerized as one of monomer components with the remaining monomer (s), the resin modifier according to the present invention is incorporated in the molecule of the resulting resin such that permanent modification effects such as permanent antistatic properties can be obtained.

As each resin modifiers according to the present invention contains ether chains in its chemical structure, it exhibits superb compatibility with monomers. When it contains AO and AO', its hydrophilicity can be easily adjusted by choosing the polymerization degrees (m and n) of the oxyalkylene groups and the kinds of the oxyalkylene groups as desired depending on the purpose of the modification and its compatibility with the monomer(s). The resin modifier according to the present invention, therefore, can be improved in its compatibility with monomer(s) and its polymer modifying effects at the same time. Use of the resin modifier according to the present invention in a resin can also impart permanent antistatic properties and anti-fogging properties to the resin.

The proportion of each resin modifier according to the present invention can be widely changed depending on the kind(s) of monomer(s), the purpose of a modification, the required performance, and so on. Preferably, however, the resin modifier can be used in a proportion of from 0.1 to 80 wt. % based on the monomer(s). Especially when desired to convert a water-soluble resin of insufficient hydrophilicity into a resin of high hydrophilicity, it is more preferred to use the resin modifier in a proportion of from 1 to 80 wt. % based on the monomer(s). When employed for other purposes, for example, to improve waterproofness, adhesion properties, antistatic properties, anti-fogging properties, dyeability, film-forming properties, weatherability, anti-blocking properties and the like or to impart compatibility to polymers for a polymer alloy, the resin modifier can be used preferably in a proportion of from 0.1 to 60 wt. % based on the monomer(s).

When the resin modifiers according to the present invention are used in resins, a crosslinkable divinyl compound—such as divinyl benzene, ethylene glycol dimethacrylate or methylene bisacrylamide—or the like can be used in a desired proportion within an ordinary proportion range to improve physical properties of the resins. Further, when employed as emulsifiers for emulsion polymerization, as dispersants for suspension polymerization or as resin modifiers, existence of a metallic oxidizing agent, for example, makes it possible to induce crosslinking of the resulting resin polymers.

EXAMPLES

The present invention will hereinafter be described in further detail based on Examples, in which all designations of "%" and "part(s)" are on a weight basis unless otherwise specifically indicated.

Production Example 1

Into a 3-L, stainless steel autoclave equipped with a stirrer, a thermometer and a nitrogen inlet tube, isotridecanol [the number of methyl groups: 4.3 (as measured by $^1$H-NMR)] (1.000 g, 5 moles) and as a catalyst, sodium hydroxide (10 g) were charged. After replacing the internal atmosphere of the reactor with nitrogen, allyl glycidyl ether (570 g, 5 moles) was fed at 90° C. Subsequent to completion of the feeding, the reaction product was allowed to age at 90° C. for 5 hours to obtain a compound (A). To the compound (A) (942 g, 3 moles), ethylene oxide (1,320 g, 30 moles) was fed at 130° C. Subsequent to completion of the feeding, the reaction product was allowed to age for 2 hours to afford a surfactant (1) according to the present invention.

Production Example 2

To the surfactant (1) (377 g, 0.5 mole), ethylene oxide (440 g, 10 moles) was fed further at 130° C. Subsequent to completion of the feeding, the reaction product was allowed to age for 2 hours to afford a surfactant (2) according to the present invention.

Production Example 3

In a 500-mL, 4-necked glass flask equipped with a stirrer, a thermometer and a nitrogen inlet tube, the compound (A) (157 g, 0.5 mole) was placed, followed by cooling to 0 to 5° C. In to the compound (A) so cooled, chlorosulfonic acid (115 g) was added dropwise through a dropping funnel. After the dropwise addition, stirring was conducted for 1 hour at the same temperature, and produced HCl was eliminated by blowing nitrogen. The resulting product was then neutralized into the sodium salt with an aqueous solution of sodium hydroxide to afford a surfactant (3) according to the present invention.

Production Example 4

In a similar manner as in Production Example 3, the surfactant (1) was treated with chlorosulfonic acid to convert it into a sulfate ester, followed by neutralization with an aqueous solution of ammonia to yield a surfactant (4) according to the present invention.

Production Example 5

In a similar flask as in Production Example 3, the surfactant (1) (452 g, 0.6 mole) was placed. After diphosphorus pentoxide (28.4 g, 0.6 mole) was added at 40° C. over 1 hour, aging was conducted at 80° C. for 2 hours. Subsequently, the reaction mixture was neutralized with an aqueous solution of sodium hydroxide to yield a surfactant (5) according to the present invention.

Production Example 6

In a similar flask as in Production Example 3, the surfactant (1) yielded in Production Example 1 (377 g, 0.5 mole) and maleic anhydride (49 g, 0.5 mole) were placed, followed by stirring at 80° C. to conduct esterification. The reaction mixture was then neutralized with an aqueous solution of potassium hydroxide to yield a surfactant (6) according to the present invention.

Production Example 7

In a similar autoclave as in Production Example 1, the surfactant (1) (377 g, 0.5 mole) was placed. Under similar conditions as in Production Example 1, a mixture of ethylene oxide (440 g, 10 moles) and propylene oxide (290 g, 5 moles) were then reacted to yield a surfactant (7) according to the present invention.

Production Example 8

In a similar flask as in Production Example 3, the surfactant (1) (377 g, 0.5 mole) and boron trifluoride-ethyl ether complex (5 g) were placed, and epichlorohydrin (38 g, 0.5 mole) was added dropwise to react it with the surfactant (1). The reaction product was then reacted with triethanolamine (75 g, 0.5 mole) to introduce an ammonium ion, whereby a surfactant (8) according to the present invention was yielded.

Production Examples 9 and 10

Following the procedures of Production Examples 1 and 2 except that 5,7,7-trimethyl-2-(1,3,3-trimethylbutyl) octanol (number of methyl groups: 8) and methallyl glycidyl ether were used in place of isotridecyl alcohol and allyl glycidyl ether, respectively, surfactants (9) and (10) according to the present invention were obtained.

Production Example 11

In a similar manner as in Production Example 3, the surfactant (9) was treated with chlorosulfonic acid to convert it into a sulfate ester, followed by neutralization with potassium hydroxide to yield a surfactant (11) according to the present invention.

Production Example 12

Into a 3-L, 4-necked glass flask equipped with a stirrer, a thermometer and a nitrogen inlet tube, "SOFTANOL 30" [trade name, product of Nippon Shokubai Co., Ltd.; adduct of 3 moles of ethylene oxide with a secondary alcohol having 12 to 14 carbon atoms (number of methyl groups: 2), hydroxyl number: 168 mgKOH/g; 668 g, 2 moles] and boron trifluoride.ethyl ether complex (5 g) were charged. At temperatures of from 30 to 80° C., epichlorohydrin (153 g, 2 moles) was added dropwise over 1 hour, followed by aging at 80° C. for 2 hours. Subsequently, 48% sodium hydroxide (250 g, 3 moles) was added dropwise at 80° C. over 30 minutes. After completion of the dropwise addition, aging was conducted at 80° C. for 2 hours. Toluene (800 g) was then added as a solvent, and the resulting mixture was washed three times with water (1,000 g×3). The thus-washed mixture was then heated under reduced pressure to drive off toluene, whereby a compound (B) was yield.

Into a similar autoclave as in Production Example 1, allyl alcohol (108 g, 2 moles) and as a catalyst, potassium oxide (4.8 g) were charged. After replacing the internal atmosphere of the autoclave with nitrogen, the compound (B) (256 g, 1 mole) was fed at 90° C. After completion of the feeding, aging was conducted at 90° C. for 5 hours. Subsequently, excess allyl alcohol was distilled off under reduced pressure. The pressure of the autoclave was then raised back to environmental pressure with nitrogen, and at 130° C., propylene oxide (290 g, 5 moles) and then, ethylene oxide (440 g, 10 moles) were fed. Subsequent to completion of the feeding, aging was conducted for 2 hours to yield a surfactant (12) according to the present invention.

Production Example 13

In a similar manner as in Production Example 5, the surfactant (12) was treated with diphosphorus pentoxide to convert it into a phosphate ester, followed by neutralization with potassium hydroxide to yield a surfactant (13) according to the present invention.

Production Example 14

Following the procedure of Production Example 1 except that methacryl glycidyl ester was used in lieu of allyl glycidyl ether, boron trifluoride ethyl ether complex was employed as a catalyst instead of sodium hydroxide, and a mixture of ethylene oxide and tetrahydrofuran was used in place of ethylene oxide, a surfactant (14) according to the present invention was yielded.

Production Example 15

In a similar manner as in Production Example 3, the surfactant (14) was treated with chlorosulfonic acid to convert it into a sulfate ester, followed by neutralization with sodium hydroxide to yield a surfactant (15) according to the present invention.

Production Example 16

Following the procedure of Production Example 1 except that isotridecanoic acid (number of methyl groups: 4.3 as measured by $^1$H-NMR) was employed in lieu of isotridecyl alcohol and boron trifluoride-ethyl ether complex was used as a catalyst instead of sodium hydroxide, a surfactant (16) according to the present invention was yielded.

Production Example 17

Following the procedures of Production Examples 1 and 4 except that isoundecyl alcohol (number of methyl groups: 3.5 as measured by $^1$H-NMR) was employed in lieu of isotridecyl alcohol, a surfactant (17) according to the present invention was yielded.

Production Example 18

Following the procedure of Production Example 1 except that the amount of allyl glycidyl ether was increased from 570 g (5 moles) to 1,140 g (10 moles), a surfactant (18) according to the present invention was yielded. Incidentally, the surfactant (18) corresponds to the formula (1) in which z is 2.

Production Example 19

Following the procedure of Production Example 1 except that isoundecyl alcohol (860 g, 5 moles) was used instead of isotridecanol (1,000 g, 5 moles) and the amount of allyl glycidyl ether was increased from 570 g (5 moles) to 855 g (7.5 moles), a surfactant (19) according to the present invention was yielded. Incidentally, the surfactant (19) corresponds to the formula (1) in which z is 1.5.

Production Example 20

Following the procedure of Production Example 4 except that the surfactant (19) was used in place of the surfactant (1), a surfactant (20) according to the present invention was yielded.

Production Example 21

Following the procedure of Production Example 5 except that the surfactant (19) was used in place of the surfactant (1), a surfactant (21) according to the present invention was yielded.

Production Example 22

Following the procedures of Production Examples 19 and 20 except that the amount of allyl glycidyl ether was increased from 855 g (7.5 moles) to 1,710 g (15 moles), a surfactant (22) according to the present invention was yielded. Incidentally, the surfactant (22) corresponds to the formula (1) in which z is 3.

Production Example 23

Into a 3-L stainless steel autoclave equipped with a stirrer, a thermometer and a nitrogen inlet tube, isoundecanol (172 g, 1 mole) and as a catalyst, sodium hydroxide (2 g) were charged. After replacing the internal atmosphere of the autoclave with nitrogen, allyl glycidyl ether (171 g, 1.5 moles) was fed at 90° C. Subsequent to completion of the feeding, aging was conducted at 90° C. for 5 hours. Butylene oxide (360 g, 5 moles) was then fed at 130° C., and after completion of the feeding, aging was conducted for 2 hours to yield a surfactant (23) according to the present invention. Incidentally, the surfactant (23) corresponds to the formula (1) in which z is 1.5.

Production Example 24

A 1:1 mixture in terms of weight ratio of the surfactant (17) according to the present invention and the surfactant (20) according to the present invention was provided as a surfactant (24) according to the present invention. The surfactant (24) corresponds to the formula (1) in which z is 1.2.

The surfactants according to the present invention, which had been obtained in the above Production Examples, have the following structural formulas, in which EO represents an oxyethylene group and PO represents an oxypropylene group. Further, THF represents a tetrahydrofuran residual group (1,4-butylene oxide residual group).

Surfactant (1)
$$C_{13}H_{27}O-CH_2CHCH_2OCH_2CH=CH_2$$
$$|$$
$$O(EO)_{10}-H$$

Surfactant (2)
$$C_{13}H_{27}O-CH_2CHCH_2OCH_2CH=CH_2$$
$$|$$
$$O(EO)_{30}-H$$

Surfactant (3)
$$C_{13}H_{27}O-CH_2CHCH_2OCH_2CH=CH_2$$
$$|$$
$$OSO_3Na$$

Surfactant (4)
$$C_{13}H_{27}O-CH_2CHCH_2OCH_2CH=CH_2$$
$$|$$
$$O(OE)_{10}-SO_3NH_4$$

Surfactant (5)
$$C_{13}H_{27}O-CH_2CHCH_2OCH_2CH=CH_2$$
$$|$$
$$O(OE)_{10}-PO_3HNa$$

$$C_{13}H_{27}O-CH_2CHCH_2OCH_2CH=CH_2$$
$$|$$
$$O(EO)_{10}$$
$$\diagdown$$
$$PO_2Na$$
$$\diagup$$
$$O(EO)_{10}$$
$$|$$
$$C_{13}H_{27}O-CH_2CHCH_2OCH_2CH=CH_2$$

Surfactant (6)
$$C_{13}H_{27}O-CH_2CHCH_2OCH_2CH=CH_2$$
$$|$$
$$O(OE)_{10}-COCH=CHCOOK$$

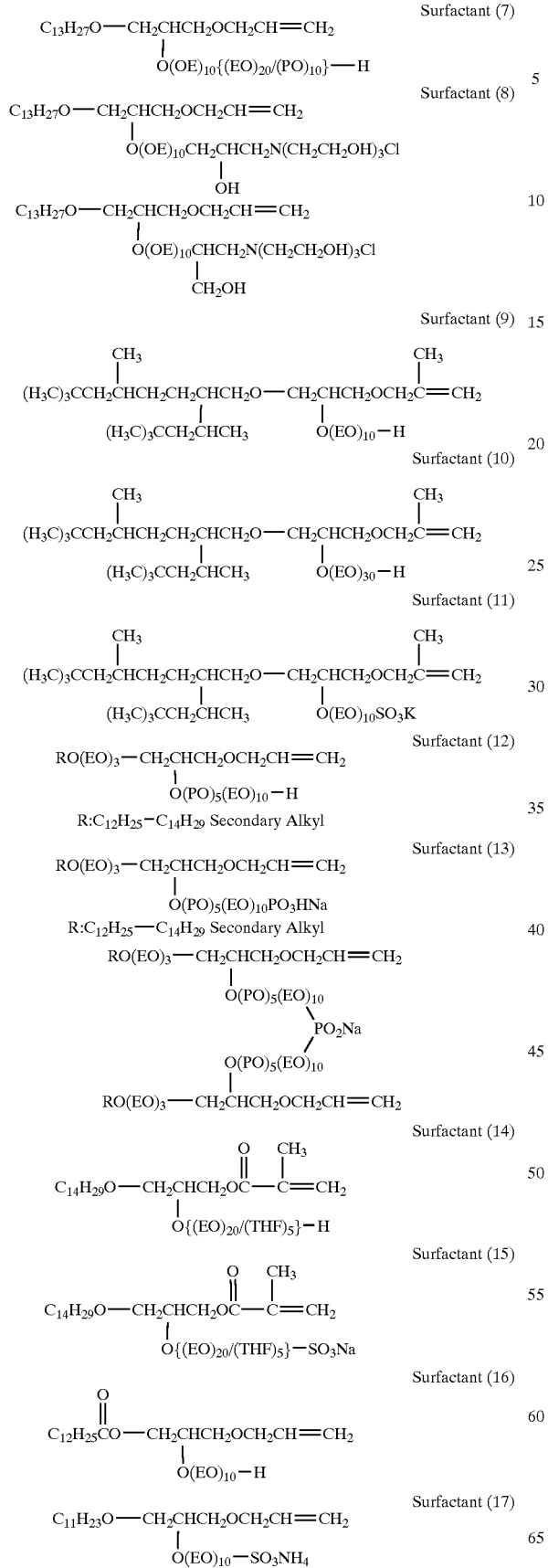
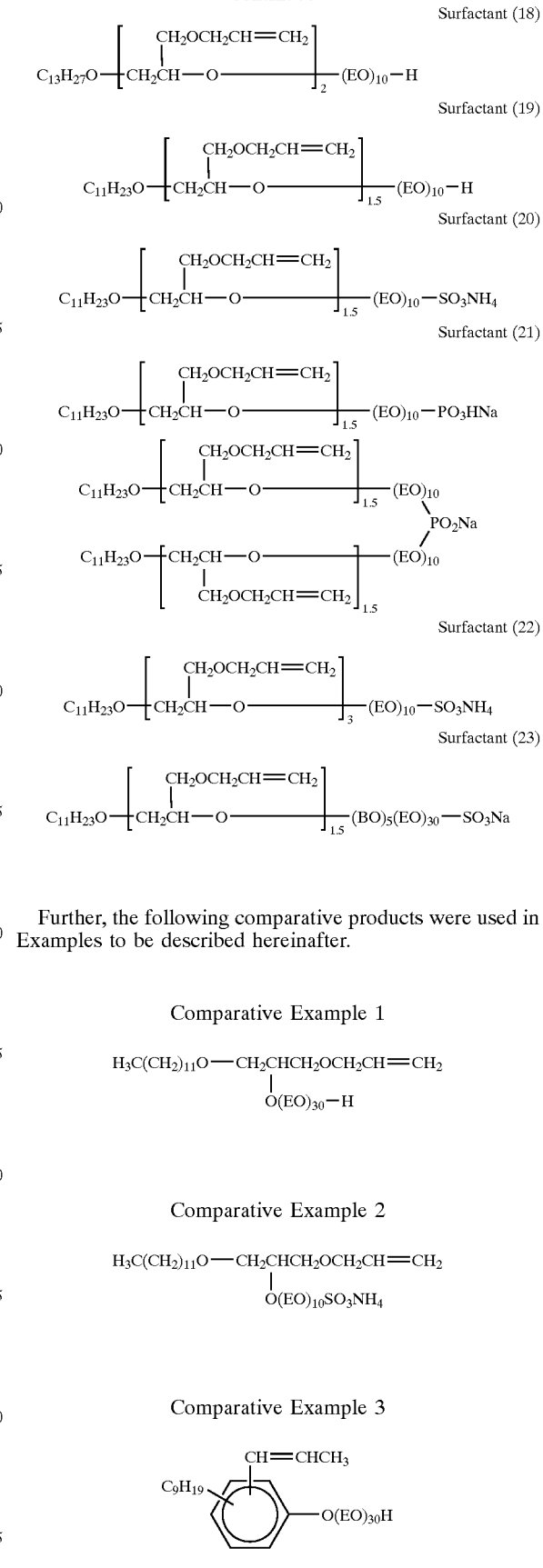
Further, the following comparative products were used in Examples to be described hereinafter.

Comparative Example 4

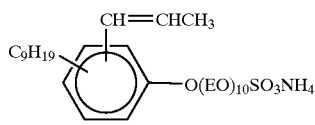

Example 1

With respect to the surfactants (1) to (24) according to the present invention, surface tensions of their aqueous solutions were measured by the Wilhelmy method. The results are shown in Table 1. The following test conditions were employed.

Measuring condition: 0.1% aqueous solution
Measuring temperature: 25° C.

TABLE 1

| Invention product | Surface tension (mN/m) |
|---|---|
| 1 | 38.1 |
| 2 | 34.1 |
| 3 | 33.8 |
| 4 | 33.1 |
| 5 | 35.5 |
| 6 | 35.6 |
| 7 | 37.2 |
| 8 | 38.5 |
| 9 | 35.2 |
| 10 | 36.9 |
| 11 | 34.8 |
| 12 | 35.8 |
| 13 | 36.1 |
| 14 | 34.5 |
| 15 | 35.7 |
| 16 | 39.1 |
| 17 | 34.4 |
| 18 | 35.2 |
| 19 | 36.3 |
| 20 | 36.1 |
| 21 | 35.1 |
| 22 | 35.2 |
| 23 | 36.1 |
| 24 | 34.8 |

Example 2

With respect to the surfactants (1) to (24) according to the present invention and the comparative products 1 to 4, their carbon black dispersing performance and toluene emulsifying performance were measured. The results are shown in Table 2. The following testing methods were employed.

<Testing Method of Carbon Black Dispersing Performance>

In a graduated cylinder of 100 mL capacity with a ground stopper, the above-described surfactant (1 g) and carbon black (10 g) were placed, and then dissolved and dispersed with water in an amount sufficient to adjust the total volume to 100 mL. The graduated cylinder was shaken 100 times in 1 minute, and then allowed to stand at 25° C. for 1 hour. Subsequently, the dispersion was drawn as much as 30 mL from the top surface of the dispersion and filtered through a glass filter. The glass filter was then dried at 105° C., and the weight of a residue on the glass filter was measured. Dispersing performance (%) was then calculated in accordance with the following formula:

Dispersing performance(%) =

{Weight of the residue on the glass filter (g)/3 (g)} × 100

<Testing Method of Toluene Emulsifying Performance>

Into a graduated test tube of 20 mL capacity with a ground stopper, a 0.5% aqueous solution (5 mL) of the above-described surfactant and toluene (5 mL) were added. The test tube was shaken 100 times in one minute, and then allowed to stand at 25° C. for 1 hour. Subsequently, the volume (mL) of an emulsified layer was measured, and the emulsifying performance (%) was calculated in accordance with the following formula:

Emulsifying performance(%) =

{Volume of the emulsified layer (mL)}/10 (mL)} × 100

TABLE 2

| | Dispersing performance (%) | Emulsifying performance (%) |
|---|---|---|
| Invention product | | |
| 1 | 87 | 90 |
| 2 | 90 | 85 |
| 3 | 88 | 89 |
| 4 | 93 | 91 |
| 5 | 91 | 88 |
| 6 | 89 | 85 |
| 7 | 85 | 83 |
| 8 | 83 | 85 |
| 9 | 87 | 91 |
| 10 | 91 | 94 |
| 11 | 89 | 90 |
| 12 | 92 | 92 |
| 13 | 92 | 89 |
| 14 | 88 | 86 |
| 15 | 87 | 87 |
| 16 | 85 | 89 |
| 17 | 90 | 91 |
| 18 | 91 | 89 |
| 19 | 91 | 88 |
| 20 | 88 | 90 |
| 21 | 85 | 85 |
| 22 | 91 | 88 |
| 23 | 89 | 91 |
| 24 | 90 | 92 |
| Comp. product | | |
| 1 | 69 | 68 |
| 2 | 71 | 73 |
| 3 | 85 | 89 |
| 4 | 86 | 88 |

Example 3

With respect to the invention surfactants (1), (12), (16) and (22) and the comparative products 2 and 4, a biodegradability test was conducted in accordance with the method of JIS-K-0102. BOD is the abbreviation of biochemical oxygen demand, and is the amount of dissolved oxygen consumed by aerobic microorganisms in water. In this test, each BOD is the amount of dissolved oxygen consumed when the corresponding sample was diluted with diluent water and then left over at 20° C. for 5 days. On the other hand, each TOD is a specific value determined from the chemical structure of the corresponding sample.

TABLE 3

| | Percent biodegradation BOD/TOD |
|---|---|
| Invention product | |
| 1 | 15.3 |
| 12 | 17.8 |
| 16 | 16.4 |
| 22 | 14.3 |
| Comp. prod. | |
| 2 | 19.3 |
| 4 | 0.12 |

Example 4

With respect to each of the invention surfactants (1) to (24) and the comparative products 1 to 4, emulsion polymerization was conducted using a mixture of 2-ethylhexyl acrylate and acrylic acid as monomers to determine its performance as an emulsifier for emulsion polymerization. Concerning the thus-obtained polymer emulsion, its particle size, amount of agglomerates, mechanical stability and foaming potential were measured, and the waterproofness of a film obtained from the polymer emulsion was measured. The results are shown in Table 4.

<Polymerization Process>

Into a reaction vessel equipped with a reflux condenser, a stirrer, a dropping funnel and a thermometer, deionized water (120 g) was charged, and the interior of the system was purged with nitrogen gas. On the side, one of the surfactants (1) to (24) and the comparative products 1 to 4 (4 g) was dissolved in a mixed monomer (2-ethylhexyl acrylate/acrylic acid=97/3 by weight; 100 g). A 10-gram aliquot of the monomer solution and ammonium persulfate (0.08 g) were added to the reaction vessel, and polymerization was initiated at 60° C. The remaining mixture of the monomers and the surfactant was continuously added dropwise into the reaction vessel over 2 hours. After completion of the dropwise addition, aging was conducted for 2 hours to afford a polymer emulsion.

<Particle Size>

The particle size of the polymer in each of the polymer emulsions after the polymerization was measured at 25° C. using an electrophoretic light scattering spectrophotometer ("ELS-800"; manufactured by OTSUKA ELECTRONICS CO., LTD.).

<Amount of Agglomerates>

Each of the polymer emulsions after the polymerization was filtered through a 325-mesh screen. The filtration residue was washed with water, and then dried at 105° C. for 2 hours. Its weight was measured and expressed in terms of weight % based on the solid content in the polymer emulsion.

<Mechanical Stability>

Each of the polymer emulsions after the polymerization was stirred at 2,000 rpm for 2 minutes in "T.K. HOMO DISPER". The amount of agglomerates was then measured by the above-described method to rank the mechanical stability.

<Foaming Potential>

Each of the polymer emulsions after the polymerization was diluted two-fold with water. A 20-mL aliquot of the thus-diluted emulsion was placed in a graduated 100-mL test tube, and was violently shaken up and down for 10 seconds. The volume of foam was measured shortly after the shaking and also 5 minutes later.

<Waterproofness of Film>

Each of the polymer emulsions after the polymerization was coated on a glass plate to form a coating of 0.2 mm in thickness. The glass plate with the coating formed thereon was then immersed in water of 50° C., and the time until 8-point characters became no longer legible through the whitened coating was determined to rank the waterproofness. The following ranking standard was employed.

A: The characters were legible even after an elapsed time of 48 hours.

B: The characters were legible after an elapsed time of 24 hours, but became no longer legible after an elapsed time of 48 hours.

C: The characters became no longer legible after an elapsed time of 1 hour.

D: The characters became illegible in less 1 hour.

TABLE 4

| | Particle size ($\mu$m) | Amount of agglomerates (%) | Mechanical stability (%) | Foaming potential (mL) | | Waterproofness |
|---|---|---|---|---|---|---|
| | | | | Shortly after | 5 min. later | |
| Invention product | | | | | | |
| 1 | 0.11 | 0.05 | 3.4 | 29 | 8 | B |
| 2 | 0.09 | 0.07 | 2.0 | 30 | 6 | B |
| 3 | 0.08 | 0.03 | 1.6 | 27 | 5 | B |
| 4 | 0.11 | 0.09 | 2.3 | 31 | 10 | B |
| 5 | 0.14 | 0.08 | 3.1 | 30 | 7 | A |
| 6 | 0.12 | 0.06 | 3.7 | 29 | 4 | B |
| 7 | 0.11 | 0.10 | 3.0 | 32 | 11 | B |
| 8 | 0.10 | 0.02 | 1.8 | 33 | 7 | B |
| 9 | 0.08 | 0.04 | 1.5 | 28 | 8 | B |
| 10 | 0.09 | 0.03 | 2.1 | 29 | 5 | B |
| 11 | 0.12 | 0.07 | 3.9 | 28 | 4 | B |
| 12 | 0.15 | 0.09 | 3.1 | 30 | 7 | B |
| 13 | 0.13 | 0.03 | 2.0 | 26 | 5 | B |
| 14 | 0.12 | 0.04 | 2.8 | 33 | 11 | A |
| 15 | 0.11 | 0.03 | 2.5 | 32 | 8 | A |
| 16 | 0.12 | 0.09 | 3.9 | 34 | 7 | B |
| 17 | 0.11 | 0.09 | 2.1 | 33 | 7 | B |
| 18 | 0.10 | 0.08 | 2.5 | 31 | 6 | A |
| 19 | 0.09 | 0.04 | 2.9 | 29 | 3 | B |
| 20 | 0.13 | 0.08 | 2.7 | 29 | 5 | A |
| 21 | 0.11 | 0.10 | 2.9 | 31 | 7 | A |
| 22 | 0.10 | 0.11 | 3.1 | 33 | 8 | A |
| 23 | 0.09 | 0.07 | 1.8 | 30 | 7 | B |
| 24 | 0.09 | 0.09 | 2.7 | 29 | 6 | B |
| Comp. product | | | | | | |
| 1 | 0.38 | 1.30 | 34.5 | 33 | 18 | D |
| 2 | 0.20 | 0.80 | 29.8 | 30 | 15 | D |
| 3 | 0.18 | 1.10 | 18.7 | 32 | 13 | C |
| 4 | 0.13 | 0.25 | 9.0 | 36 | 13 | C |

Example 5

With respect to each of the invention surfactants (1) to (24) and the comparative products 1 to 4, emulsion polymerization was conducted using a mixture of ethyl acrylate, butyl acrylate and styrene as monomers to determine its performance as a dispersant for emulsion polymerization. Concerning the thus-obtained polymer emulsion, concerning the thus-obtained polymer emulsion, its particle size, amount of agglomerates and mechanical stability were measured, and the waterproofness and impact resistance of a film obtained from the polymer emulsion were measured.

The results are shown in Table 5.

<Polymerization Process>

Polymer emulsions were obtained in a similar manner as in Example 4 except that the mixed monomer was a mixture of ethyl acrylate/butyl acrylate/styrene at a weight ratio of 49/49/2.

<Impact Resistance>

Each of the polymer emulsions after the polymerization was coated on mild steel plates (200 mm×100 mm×4 mm) to prepare specimens each of which had a coating of 0.5 mm in thickness. With respect to the specimens, an impact resistance test was conducted following the chip test A in JIS-K-5400 (General Testing Methods for Paints). Incidentally, the test was conducted ten times and each of the specimens was visually observed for possible cracking or chipping of its coating caused by an impact of a weight (falling steel ball). The impact resistance was ranked in accordance with the following standard:

A: Neither cracking nor chipping by the weight was observed, or cracking or chipping by the weight was observed once.

B: Cracking or chipping by the weight was observed twice or three times.

C: Cracking or chipping by the weight was observed four times or more.

TABLE 5

|   | Particle size (μm) | Amount of agglomerates (%) | Mechanical stability (%) | Waterproofness | Impact resistance |
|---|---|---|---|---|---|
| Invention product | | | | | |
| 1 | 0.10 | 0.09 | 18.3 | B | B |
| 2 | 0.08 | 0.08 | 15.7 | B | B |
| 3 | 0.09 | 0.04 | 18.5 | B | B |
| 4 | 0.10 | 0.08 | 17.3 | B | A |
| 5 | 0.16 | 0.08 | 17.8 | B | B |
| 6 | 0.10 | 0.06 | 16.9 | A | A |
| 7 | 0.13 | 0.11 | 15.1 | B | B |
| 8 | 0.11 | 0.06 | 16.1 | B | B |
| 9 | 0.09 | 0.07 | 18.5 | B | B |
| 10 | 0.07 | 0.05 | 17.6 | B | B |
| 11 | 0.11 | 0.08 | 18.9 | B | B |
| 12 | 0.17 | 0.10 | 17.1 | B | B |
| 13 | 0.13 | 0.04 | 15.7 | B | A |
| 14 | 0.10 | 0.05 | 16.6 | B | A |
| 15 | 0.15 | 0.09 | 18.8 | B | A |
| 16 | 0.11 | 0.12 | 19.5 | B | B |
| 17 | 0.08 | 0.07 | 18.2 | B | B |
| 18 | 0.09 | 0.08 | 17.1 | A | A |
| 19 | 0.11 | 0.08 | 20.1 | B | A |
| 20 | 0.09 | 0.10 | 18.9 | A | A |
| 21 | 0.10 | 0.09 | 17.1 | A | A |
| 22 | 0.16 | 0.12 | 20.3 | A | A |
| 23 | 0.14 | 0.11 | 15.1 | A | A |
| 24 | 0.09 | 0.09 | 19.7 | A | A |
| Comp. product | | | | | |
| 1 | 0.26 | 1.60 | 42.1 | C | C |
| 2 | 0.15 | 1.20 | 38.3 | C | B |
| 3 | 0.26 | 1.19 | 21.5 | C | C |
| 4 | 0.13 | 0.30 | 19.9 | B | C |

Example 6

With respect to each of the invention surfactants (1) to (7), (9) to (13) and (17) to (24) and the comparative products 1 to 4, suspension polymerization was conducted using vinyl chloride as a monomer to determine its performance as a dispersant for suspension polymerization. Concerning the thus-obtained polymer, tests were conducted in accordance with the following testing methods. The results are shown in Table 6.

<Polymerization Process>

Into a 500-mL stainless steel autoclave equipped with a stirrer, a thermometer and a nitrogen inlet tube, deionized water (100 g), one of the invention surfactants (1) to (7), (9) to (13) and (17) to (24) and the comparative products 1 to 4 (2 g) and di-2-ethylhexyl peroxycarbonate (0.2 g) were charged. After the autoclave was purged to 7 kPa to eliminate oxygen, vinyl chloride monomer (100 g) was charged. The autoclave was heated to 57° C. under stirring at 500 rpm to conduct polymerization. The internal pressure of the autoclave was 0.8 MPa at the time of the initiation of the polymerization. Seven hours after the initiation of the polymerization, the internal pressure dropped to 0.4 MPa so that at that point, the polymerization was terminated. Unreacted vinyl chloride monomer was purged, and the contents were taken out of the autoclave and then dewatered and dried.

<Particle Size Distribution>

Among the thus-obtained resin particles, the weight percentage of those not passing through a 250-mesh sieve (a wire screen of the Tyler mesh standard) was measured.

<Waterproofness Test>

A sol was prepared in accordance with the following formulation. The sol was then formed into a thickness of 0.5 mm, followed by heating at 190° C. for 10 minutes into a sheet. The sheet was immersed for 24 hours in water of 23° C., and its light transmittance (%) was measured.

| Resultant resin | 50 parts |
|---|---|
| Di(2-ethylhexyl) phthalate | 30 parts |
| Ba/Zn based stabilizer | 1 part |

<Thermal Stability Test>

With respect to each of the invention surfactants (1) to (7), (9) to (13) and (17) to (24) and the comparative products 1 to 4, the same sol as that subjected to the waterproofness test was poured into an aluminum-made mold. After the sol was left over for 30 minutes in a hot air atmosphere of 190° C., a change in color tone was ranked in accordance with a 5-level grading scale ranging from "A" (small change) to "E" (large change).

TABLE 6

|   | Particle size distribution (%) | Waterproofness (%) | Thermal stability |
|---|---|---|---|
| Invention product | | | |
| 1 | 0.0 | 89 | A |
| 2 | 0.0 | 88 | A |
| 3 | 0.0 | 89 | A |
| 4 | 0.0 | 86 | B |
| 5 | 0.0 | 87 | A |
| 6 | 0.0 | 86 | A |
| 7 | 0.0 | 85 | A |
| 9 | 0.0 | 87 | A |
| 10 | 0.0 | 85 | A |
| 11 | 0.0 | 84 | A |
| 12 | 0.0 | 86 | A |
| 13 | 0.0 | 87 | A |
| 17 | 0.0 | 88 | A |
| 18 | 0.0 | 88 | A |
| 19 | 0.0 | 86 | A |
| 20 | 0.0 | 87 | B |
| 21 | 0.0 | 89 | A |
| 22 | 0.0 | 90 | B |

TABLE 6-continued

| | Particle size distribution (%) | Waterproofness (%) | Thermal stability |
|---|---|---|---|
| 23 | 0.0 | 88 | A |
| 24 | 0.0 | 87 | A |
| Comp. product | | | |
| 1 | 3.4 | 76 | D |
| 2 | 2.0 | 71 | E |
| 3 | 0.0 | 85 | D |
| 4 | 1.3 | 87 | D |

Example 7

With respect to each of the invention surfactants (1) to (24) and the comparative products 1 to 4, solution polymerization of styrene was conducted to determine its performance as a resin modifier. Concerning the thus-obtained resin, tests were conducted in accordance with the below-described testing methods. As a blank, solution polymerization was conducted without addition of any resin modifier. The results are shown in Table 7.

<Polymerization Process>

Into a similar reaction vessel as in Example 4, xylene (100 g) were charged, and the interior of the system was purged with nitrogen gas. On a side, a mixed solution of styrene (150 g), one of the invention surfactants (1) to (24) and the comparative products 1 to 4 (15 g), benzoyl peroxide (2 g) and di(tertiary butyl) peroxide (1 g) was prepared. At a reaction temperature of 130° C., the mixed solution was continuously added dropwise into the reaction vessel over 2 hours. Further, a mixed solution of xylene (10 g), benzoyl peroxide (0.5 g) and di(tertiary butyl) peroxide (0.5 g) was added dropwise, followed by a reaction for 2 hours. The reaction mixture was then cooled to afford a polymer solution.

<Anti-Fogging Properties>

The polymer solution was coated on a glass plate to produce a polymer film of 0.2 mm in thickness. The contact angle (O) of water on the polymer film was measured to rank its anti-fogging properties.

<Antistatic Properties>

The above-described polymer films were left over for 24 hours in an atmosphere of 20° C. and 50% R.H., and their surface resistivity values were measured.

<Persistency of Antistatic Properties and Anti-Fogging Properties>

The polymer films which had been tested for antistatic properties and anti-fogging properties as described above were wiped with water (50 times) by water-soaked absorbent cotton. After left over for 30 minutes in an atmosphere of 20° C. and 35% R.H., their surface resistivity values and the contact angles of water on them were measured.

TABLE 7

| | Contact angle (°) | | Surface resistivity (Ω) | |
|---|---|---|---|---|
| | Before wiped with water | After wiped with water | Before wiped with water | After wiped with water |
| Invention product | | | | |
| 1 | 22.5 | 31.6 | $4.8 \times 10^{10}$ | $9.4 \times 10^{10}$ |
| 2 | 24.7 | 27.8 | $2.8 \times 10^{11}$ | $5.0 \times 10^{11}$ |
| 3 | 30.1 | 31.8 | $7.8 \times 10^{10}$ | $2.0 \times 10^{11}$ |
| 4 | 28.3 | 28.7 | $5.5 \times 10^{10}$ | $1.0 \times 10^{11}$ |
| 5 | 29.4 | 30.6 | $1.3 \times 10^{11}$ | $2.8 \times 10^{11}$ |
| 6 | 21.5 | 32.2 | $3.9 \times 10^{10}$ | $7.8 \times 10^{10}$ |
| 7 | 22.2 | 34.1 | $6.4 \times 10^{10}$ | $5.5 \times 10^{11}$ |
| 8 | 29.0 | 31.4 | $2.4 \times 10^{10}$ | $5.3 \times 10^{10}$ |
| 9 | 30.8 | 37.5 | $2.6 \times 10^{11}$ | $3.8 \times 10^{11}$ |
| 10 | 31.1 | 32.2 | $7.1 \times 10^{10}$ | $3.0 \times 10^{11}$ |
| 11 | 29.3 | 30.7 | $4.5 \times 10^{10}$ | $1.3 \times 10^{11}$ |
| 12 | 29.8 | 33.6 | $1.1 \times 10^{11}$ | $2.6 \times 10^{11}$ |
| 13 | 27.5 | 30.2 | $3.7 \times 10^{10}$ | $6.8 \times 10^{10}$ |
| 14 | 32.2 | 38.1 | $5.4 \times 10^{10}$ | $5.9 \times 10^{11}$ |
| 15 | 29.5 | 33.6 | $3.8 \times 10^{10}$ | $7.4 \times 10^{10}$ |
| 16 | 26.5 | 33.6 | $4.9 \times 10^{10}$ | $9.7 \times 10^{10}$ |
| 17 | 31.1 | 32.1 | $5.3 \times 10^{10}$ | $8.2 \times 10^{10}$ |
| 18 | 30.7 | 31.9 | $1.2 \times 10^{11}$ | $1.5 \times 10^{11}$ |
| 19 | 29.9 | 34.2 | $3.3 \times 10^{10}$ | $6.2 \times 10^{10}$ |
| 20 | 30.1 | 33.8 | $8.9 \times 10^{10}$ | $1.1 \times 10^{11}$ |
| 21 | 28.9 | 32.2 | $5.9 \times 10^{10}$ | $7.9 \times 10^{10}$ |
| 22 | 27.5 | 31.9 | $6.5 \times 10^{10}$ | $8.8 \times 10^{10}$ |
| 23 | 28.8 | 33.1 | $4.4 \times 10^{10}$ | $8.3 \times 10^{10}$ |
| 24 | 29.2 | 31.8 | $3.7 \times 10^{10}$ | $5.9 \times 10^{10}$ |
| Comp. product | | | | |
| 1 | 54.6 | 71.2 | $2.8 \times 10^{11}$ | $3.9 \times 10^{14}$ |
| 2 | 49.9 | 86.2 | $5.0 \times 10^{10}$ | $6.9 \times 10^{14}$ |
| 3 | 36.4 | 40.0 | $1.3 \times 10^{11}$ | $2.7 \times 10^{12}$ |
| 4 | 31.5 | 43.2 | $3.9 \times 10^{10}$ | $7.8 \times 10^{11}$ |
| Blank | 98.3 | 98.5 | $1.0 \times 10^{16}$ | $1.0 \times 10^{16}$ |

Industrial Applicability

As an advantageous effect, the present invention provides surfactants, which do not contain any phenyl ether group considered to have significant effects on the environment, such as a nonylphenyl group, and have performance comparable with reactive surfactants containing one or more phenyl ether groups.

What is claimed is:

1. A surfactant represented by the following formula (1):

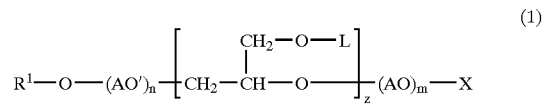

(1)

wherein $R^1$ represents a branched aliphatic hydrocarbon group, or a branched aliphatic acyl group, which branched aliphatic hydrocarbon group or branched aliphatic acyl group has 8 to 36 carbon atoms and contains at least three methyl groups, AO and AO' each independently represents an oxyalkylene group having 2 to 4 carbon atoms, L represents a group represented by formula (2) to be described below, z stands for a number of from 1 to 10, X represents a hydrogen atom or an ionic hydrophilic group, m stands for a number of from 0 to 1,000, and n stands for a number of from 0 to 1,000;

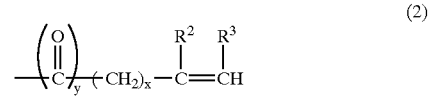

(2)

wherein $R^2$ and $R^3$ each independently represents a hydrogen atom or a methyl group, x stands for a number of from 0 to 12, and y stands for a number of 0 or 1.

2. A surfactant according to claim 1, wherein in formula (1), X represents an anionic hydrophilic group.

3. A surfactant according to claim 2, wherein in formula (1), wherein X is an anionic hydrophilic group represented by —$SO_3M$, —$R^4$—$SO_3M$, —$R^5$—COOM, —$PO_3M_2$, —$PO_3$ MH or —CO—$R^6$—COOM in which M represents a hydrogen atom, an alkali metal atom, an alkaline earth metal atom or an ammonium ion with a proviso that the number of M is ½ where M is an alkaline earth metal atom, $R^4$ and $R^5$ each independently represents an alkylene group, and $R^6$ represents a residual group obtained by eliminating carboxyl groups from a dibasic acid or an anhydride thereof.

4. A surfactant according to claim 1, wherein in formula (1), X is a cationic hydrophilic group.

5. A surfactant according to claim 4, wherein in formula (1), X is a cationic hydrophilic group represented by —$R^7$—$NR^8R^9R^{10}$Y or -Z-$NR^8R^9R^{10}$—Y in which $R^7$ represents an alkylene group, $R^8$ to $R^{10}$ each independently represents an alkyl group having 1 to 4 carbon atom, an alkanol group having 2 to 4 carbon atoms or a benzyl group, Y represents a halogen atom or a methylsulfuric group, and Z represents a group represented by —$CH_2CH(OH)CH_2$— or —CH($CH_2OH$)$CH_2$—.

6. A surfactant according to claim 1, wherein in formula (1), z is a number of from 1 to 8.

7. A surfactant according to claim 2, wherein in formula (1), z is a number of from 1 to 8.

8. A surfactant according to claim 3, wherein in formula (1), z is a number of from 1 to 8.

9. A surfactant according to claim 4, wherein in formula (1), z is a number of from 1 to 8.

10. A surfactant according to claim 5, wherein in formula (1), z is a number of from 1 to 8.

11. In a process for emulsion polymerization using an emulsifier, the improvement comprising using the surfactant according to claim 1.

12. In a process for suspension polymerization using a dispersant, the improvement comprising using the surfactant according to claim 1.

13. A composition comprising a resin and a resin modifier, wherein the resin modifier comprises a surfactant according to claim 1.

* * * * *

UNITED STATES PATENT AND TRADEMARK OFFICE
CERTIFICATE OF CORRECTION

PATENT NO. : 6,841,655 B1  
DATED : January 11, 2005  
INVENTOR(S) : Gota et al.

Page 1 of 1

It is certified that error appears in the above-identified patent and that said Letters Patent is hereby corrected as shown below:

<u>Title page,</u>  
Item [75], Inventors, should read:
-- [75] Inventors: Tetsuya Gota, Tokyo (JP); Kazushi Kobayashi, Tokyo (JP); Kaoru Komiya, Tokyo (JP); Masahide Tsuzuki, Tokyo (JP); Takeaki Mizutari, Tokyo (JP); Koji Beppu, Tokyo (JP) --

Signed and Sealed this

Nineteenth Day of April, 2005

JON W. DUDAS  
*Director of the United States Patent and Trademark Office*